C. P. BOSSERT.
APPARATUS FOR DIPPING HIDES OR OTHER ARTICLES.
APPLICATION FILED JUNE 28, 1918.

1,359,225.

Patented Nov. 16, 1920.
7 SHEETS—SHEET 1.

Witnesses:
Robert H. Weir
Arthur W. Carlson

Inventor
Charles P. Bossert.
By Edwin B. H. Tower Jr.
Atty.

C. P. BOSSERT.
APPARATUS FOR DIPPING HIDES OR OTHER ARTICLES.
APPLICATION FILED JUNE 28, 1918.

1,359,225.

Patented Nov. 16, 1920.
7 SHEETS—SHEET 6.

Witnesses:
Robert H. Weir
Arthur W. Carlson

Inventor
Charles P. Bossert
By Edwin B. H. Tower Jr. Atty.

C. P. BOSSERT.
APPARATUS FOR DIPPING HIDES OR OTHER ARTICLES.
APPLICATION FILED JUNE 28, 1918.

1,359,225.

Patented Nov. 16, 1920.
7 SHEETS—SHEET 7.

Fig. 13

Witnesses:
Robert H. Weir
Arthur W. Carlson

Inventor
Charles P. Bossert
By Edwin B. H. Tower Atty.

UNITED STATES PATENT OFFICE.

CHARLES P. BOSSERT, OF MILWAUKEE, WISCONSIN.

APPARATUS FOR DIPPING HIDES OR OTHER ARTICLES.

1,359,225. Specification of Letters Patent. Patented Nov. 16, 1920.

Application filed June 28, 1918. Serial No. 242,400.

*To all whom it may concern:*

Be it known that I, CHARLES P. BOSSERT, a citizen of the United States, residing at Milwaukee, in the county of Milwaukee and State of Wisconsin, have invented new and useful Improvements in Apparatus for Dipping Hides or other Articles, of which the following is a specification.

This invention relates to apparatus for dipping hides, skins or other articles into baths or solutions.

One object is to provide a dipping machine wherein the mechanism for moving the hides or other articles from one vat or station to another is automatically set into effective operation when such articles have been lifted free from the vat or vats.

Another object is to provide a dipping machine wherein mechanism for raising and lowering the articles for dipping them in the vats is at all times under the control of the operator, and wherein mechanism for shifting the articles from one vat or station to another is automatically operated or controlled by the raising and lowering mechanism.

Another object is to provide an apparatus by means of which articles such as hides may be dipped more expeditiously than heretofore.

Other objects and advantages will hereinafter appear.

An embodiment of the invention is illustrated in the accompanying drawings. The views of the drawings are as follows.

One embodiment of the invention will be specifically described, but it will be understood that the specific description is for the purpose of making the construction and operation of one form of the invention clear and it should therefore not be construed in a limiting sense.

The apparatus in general comprises a circular series of vats, between the first and last of which there is a loading and unloading space or station. A frame which may be raised and lowered by hydraulic means carries a circular series of racks upon which the hides may be suspended. There is one rack for each vat and preferably two additional racks so that when the frame is lowered a rack will be lowered into each vat and there will be two racks in the above mentioned loading and unloading space. When the frame is raised so as to lift the hides out of the vats, fluid operated means is automatically brought into operation to impart rotative movement to the frame so that when the frame is again lowered the racks will have progressed a sufficient distance to cause each set of hides to be dipped in the next succeeding vat. At each dipping operation the rack which moves from the last vat to the open space is unloaded and the other rack adjacent thereto is loaded. Therefore, after a rack is unloaded it moves to its next position in the above mentioned open space where it is loaded and at the next operation it is dipped into the first vat.

Figure 1:
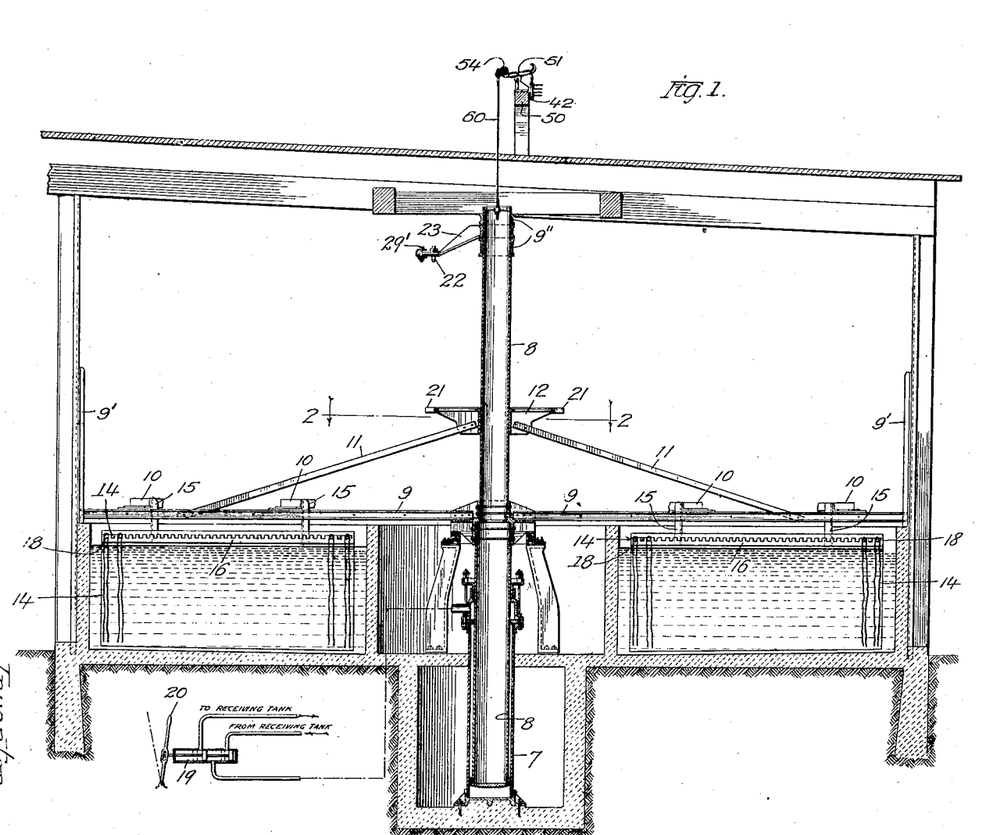
Figure 1 is a vertical section of the apparatus, the main controlling valve being represented diagrammatically.
Figure 2:
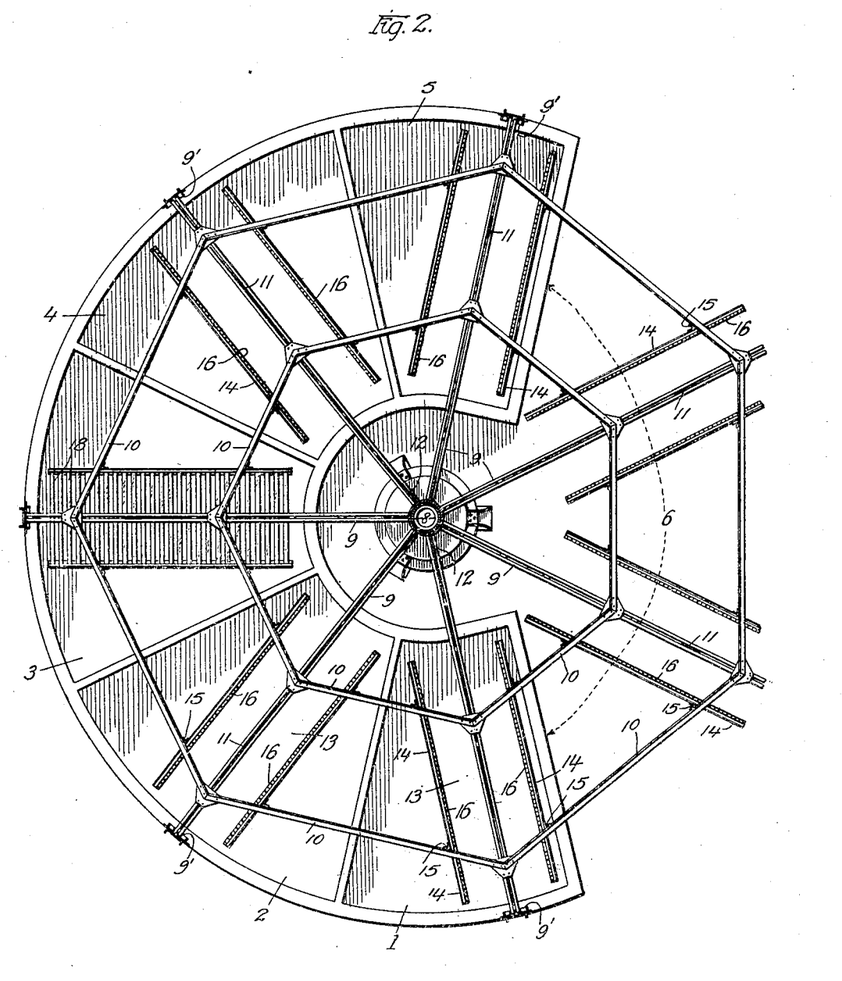
Fig. 2 is a horizontal section on line 2—2 of Fig. 1.

Figs. 1 and 2 show the arrangement of the vats and racks and show the frame upon which the racks are mounted. In these figures the vats are numbered from 1 to 5. They are arranged in an arcuate series as shown in Fig. 2. They may be made of any suitable material, but in the present instance they are made of concrete. The vats are adapted to contain the solutions into which it is desired to dip the hides successively. Between the first and last vats there is an open space 6, which has hereinbefore been referred to as the loading and unloading space. The frame upon which the racks are mounted and the mechanism for raising and lowering this frame will now be described.

A hydraulic cylinder 7 (Fig. 1) is located in coaxial relation with the vats. A plunger 8 operates in the cylinder 7 and extends for a considerable distance above the cylinder. The upper end of the plunger 8 is guided in the bearings 9'' which, as will hereinafter appear, are carried by some fixed part of the apparatus.

Figures 3, 4:
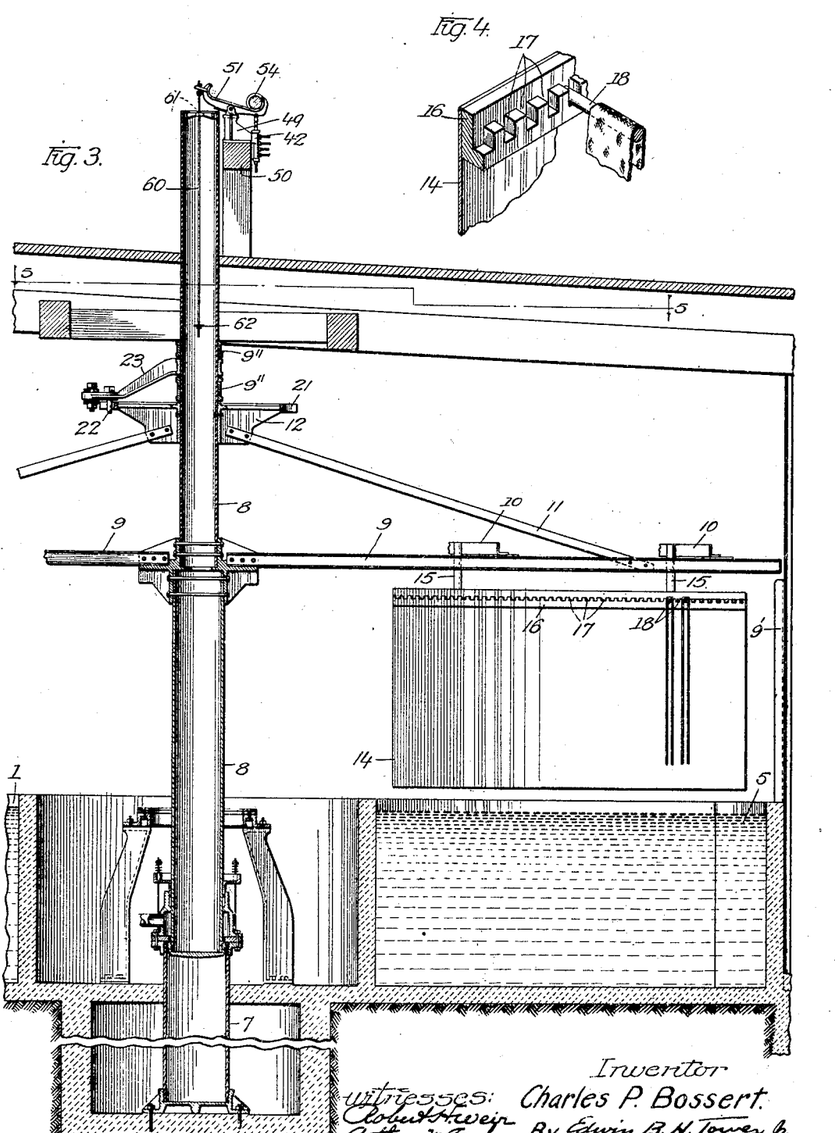
Fig. 3 is an enlarged vertical section of a portion of the apparatus shown in Fig. 1, the plunger and racks being shown in their raised position.
Fig. 4 is a perspective of one of the racks showing how the hides may be loaded thereon.

A plurality of radial arms 9 (see both Figs. 1 and 2) are secured to the plunger 8 and these arms are spaced apart and held in fixed relation by means of the bars 10. A brace 11 extends from each arm 9 to a ratchet wheel 12 which is rigidly secured to the plunger 8. This ratchet wheel will be later described and its function made clear. The racks upon which the hides are loaded are suspended from the bars 10. There is one rack 13 supported under each arm 9 as shown in Fig. 2. Each rack may comprise a pair of plates 14 which are suspended from the bars 10 by means of short angle irons 15. At the upper inner edge of each plate 14 there is a bar 16 having a plurality of seats 17. A detail of this construction is shown in Fig. 4. Cross rods 18 may therefore be removably supported between the two plates 14 of any rack by positioning the ends of the rods 18 in the seats 17. A hide may be hung over each rod 18 and therefore a rack may support a large number of hides as a large number of rods 18 may be used in each rack.

It will be noted from Fig. 2 that there are five vats and seven racks. Therefore, at any time there are two racks in the loading and unloading space 6. Of course, this arrangement may be modified so that there will be any number of vats and any number of racks, for instance, five vats and six racks. In this case there would be only one rack in the loading and unloading space 6.

From the structure so far described it is obvious that the series of racks are rigidly carried by the plunger 8 and when the plunger is raised and lowered all of the racks will be simultaneously raised and lowered as a unit.

When the frame descends the extremity of each arm 9 engages in a guide 9' so that the frame will not rotate as it descends. When the frame is raised the arms 9 leave the guide before the limit of the upward movement is reached so that the frame may be rotated in the manner to be hereinafter described.

The plunger is raised and lowered by admitting motive fluid, such as water under pressure, to the cylinder 7 and discharging it therefrom. The supply of water to the cylinder 7 may be controlled by means of a suitable valve such as that diagrammatically illustrated in Fig. 1 at 19. When the hand lever 20 is in the full line position water may be admitted from a source of supply to the hydraulic cylinder 7 and then the plunger 8 will be raised. When the hand lever 20 is moved to the dotted line position the water is allowed to escape from the cylinder 7 back to a receiving tank to permit the plunger 8 to be lowered. The mechanism for imparting rotative movement to the plunger 8 and to the racks is automatically set in operation when the plunger reaches its raised position. This mechanism operates to rotate the plunger through a predetermined angle so that when the plunger is lowered the racks will have advanced sufficiently to cause each rack to lower into the next succeeding vat. This mechanism for automatically imparting rotative movement to the racks when the plunger reaches its raised position will now be described.

Figure 5:
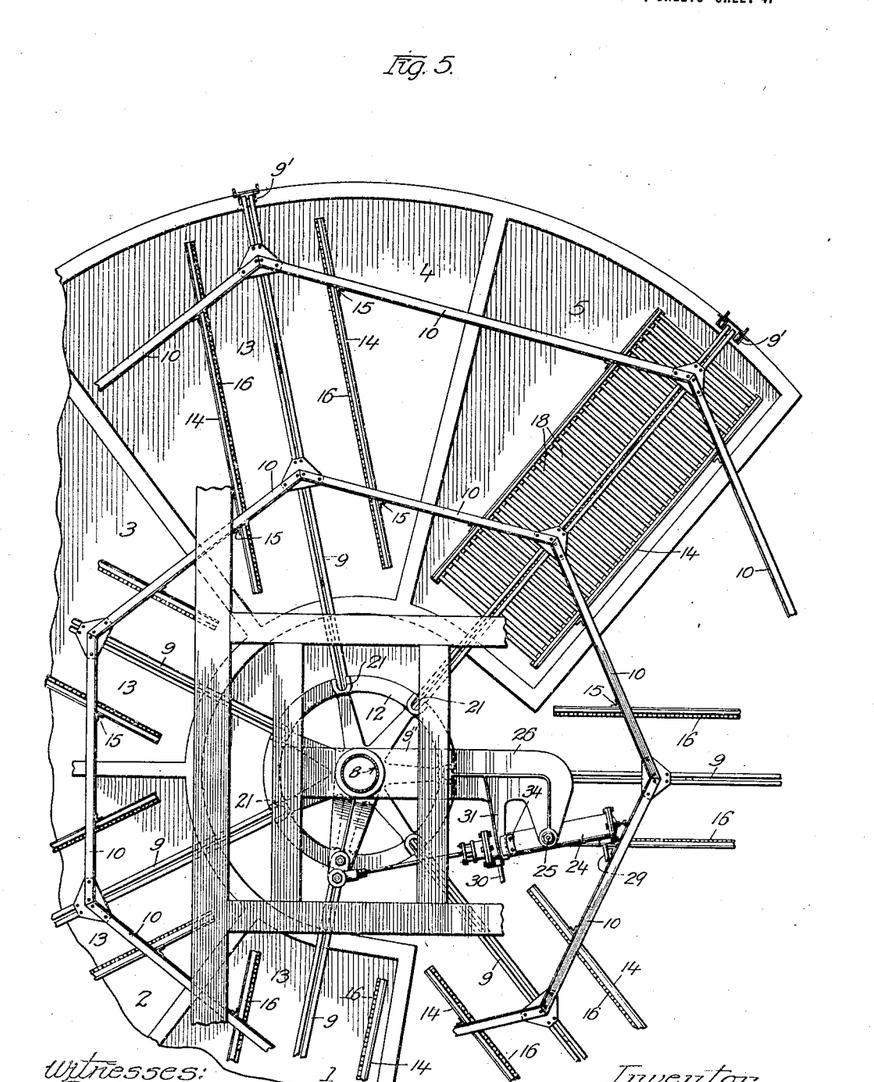
Fig. 5 is a horizontal section on line 5—5 of Fig. 3.
Figure 6:
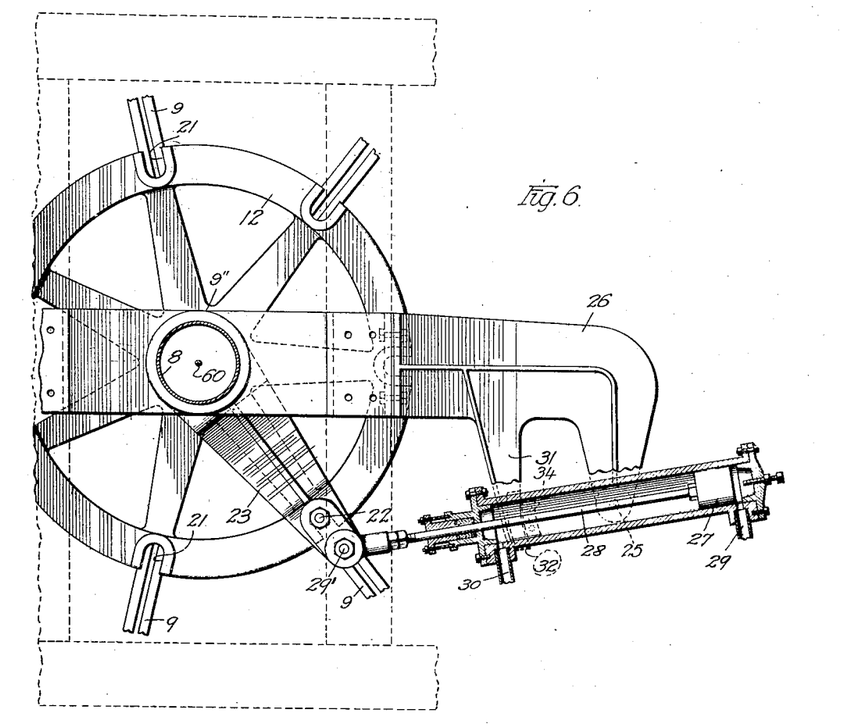
Fig. 6 is a top plan partly in section of a portion of the mechanism for turning the racks.
Figure 7:
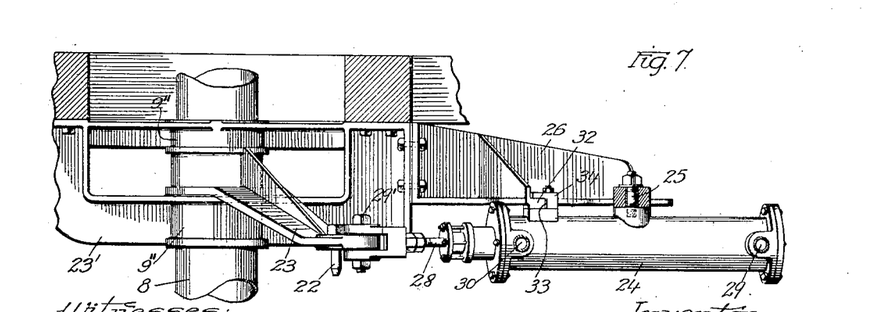
Fig. 7 is an elevation of the structure shown in Fig. 6.

The ratchet wheel 12 mentioned above forms a part of this mechanism. It is provided with a series of peripheral notches 21 as shown in Figs. 5 and 6. These notches are equal in number to the number of racks. The ratchet wheel 12 being rigidly secured to the plunger 8 moves up and down therewith. When the ratchet wheel 12 is in its raised position one of the notches 21 is in engagement with a pin 22 carried by an oscillating arm 23. This arm is mounted to swing freely about the plunger 8. It is supported between the two bearings 9'' which are carried by a stationary bracket 23' (Fig. 7). The normal position of the arm 23 is such that when the ratchet wheel 12 rises the pin 22 will engage in one of the notches 21. The arm 23 is then automatically moved a sufficient distance to turn the ratchet wheel 12 and the racks through the necessary number of degrees. When the ratchet wheel 12 is lowered together with the plunger and racks, the ratchet wheel 12 separates from the arm 23 and when the racks reach their lowermost position the arm 23 is returned to its initial position. Fig. 1 shows the ratchet wheel 12 in its lowermost position and Fig. 3 shows it in its raised position in operative relation with the arm 23. The arm 23 is oscillated to produce the above results by the fluid operated mechanism now to be described.

A cylinder 24 is pivotally suspended by means of a pivot 25 from a bracket 26, which is in turn supported from the bracket 23' (Figs. 6 and 7). A piston 27 is mounted in the cylinder 24 and its piston rod 28 is pivotally connected at 29' to the extremity of the arm 23. A pair of ports 29 and 30 admit motive fluid to and discharge it from the cylinder 24. The piston 27 and the arm 23 are in the position shown in Figs. 6 and 7 when the frame and the ratchet wheel 12 move upwardly. Then when motive fluid is admitted to the right hand end of the cylinder 24 in a manner to be hereinafter described the piston forces the arm 23 to the position shown in Fig. 5. The extremity of the piston rod 28 moves in an arc of a circle and this is why the cylinder 24 is pivotally mounted at 25. As the piston rod 28 moves back and forth the cylinder 24 oscillates slightly about its pivot 25. In order to steady the cylinder the bracket 26 is provided with an extension 31, the end of which forms a guide 32. This guide operates in a guideway 33 formed by securing a properly shaped block 34 to the cylinder 24.

The movement of the piston 27 from the position shown in Fig. 6 to the position in Fig. 5 may be called the operative stroke of this piston because when it makes this stroke it turns the ratchet wheel 12, and therefore imparts rotative movement to the entire series of racks. When the frame and racks are loaded the piston 27 is automatically returned to its initial position, but during this movement it is moving no load because the ratchet wheel 12 is not in operative relation with the arm 23. This may be called the return stroke of the piston 27.

Figure 13:
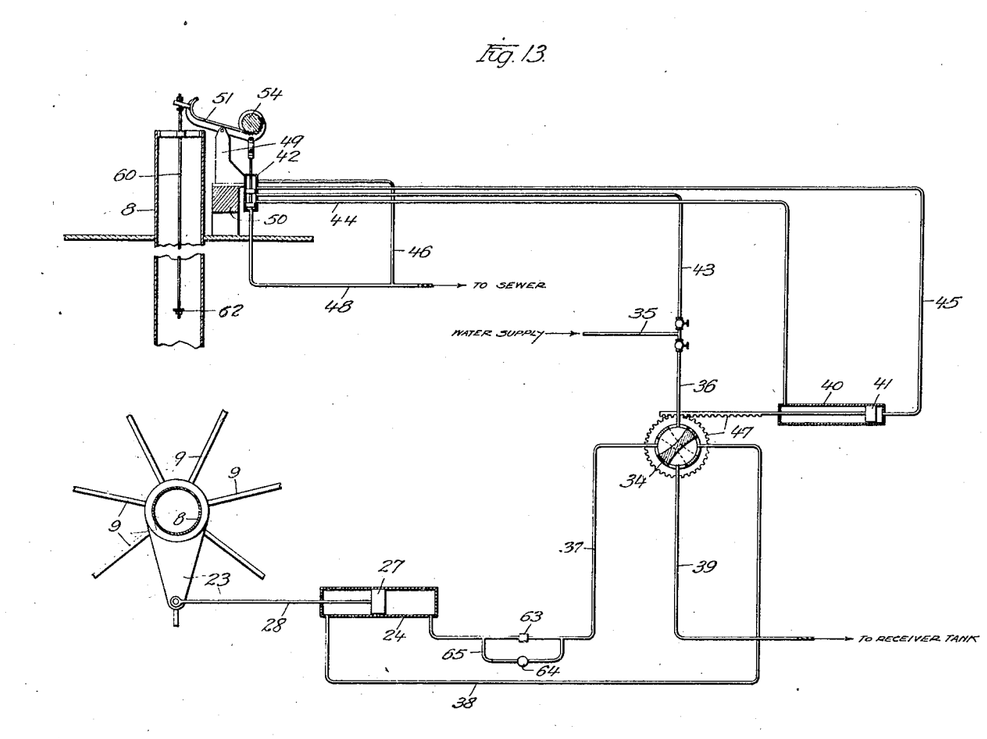
Fig. 13 shows diagrammatically the valve mechanism and the piping which is used to effect the turning or rotative movement of the racks.

The motive fluid admitted to and exhausted from the cylinder 24 is controlled by means of a valve 34 (Fig. 13). In this figure the parts are diagrammatically illustrated to give a better understanding of their operation. In this figure the arm 23 and the piston 27 are shown in their mid position and are supposed to be moving from the right to the left. In other words, the piston 27 is making its operative stroke. This is due to the fact that the valve 34 is in a position to admit motive fluid, such as water, from a supply pipe 35 through a pipe 36 and then through a pipe 37 to the right hand end of the cylinder 24. The motive fluid in the left end of the cylinder 24 is being discharged through a pipe 38, then through the valve 34 and a pipe 39 to a receiver tank. When the valve 34 is in the dotted line position shown in Fig. 13, the motive fluid will pass from the pipe 35 to the pipe 36, then through the pipe 38 to the left hand end of the cylinder 24. The motive fluid in the right hand end of the cylinder will then discharge through the pipe 37, the valve 34 and the pipe 39. Under these conditions the piston 27 will make its return stroke.

The valve 34 is operated by an auxiliary cylinder and piston shown at 40 and 41. The motive fluid admitted to and discharged from this cylinder is controlled by means of a valve 42 which is operated directly by movements of the plunger 8. When the valve 42 is in the position shown in Fig. 13, (this being the position it will assume when the plunger 8 is raised as will hereinafter appear) water is admitted from the supply pipe 35 through a pipe 43 to the valve 42, then through a pipe 44 to the left end of the cylinder 40. The motive fluid from the right end of the cylinder 40 may then be discharged through a pipe 45 through the valve 42 and then through a discharge pipe 46. Under these conditions the piston 41 will move to the position shown in Fig. 13 and a rack and pinion 47 will have shifted the valve 34 to the position in which the piston 27 makes its operative stroke. When the valve 42 moves to its other position, as when the plunger 8 is lowered, motive fluid will be admitted from the pipe 35 through the pipe 43 to the valve 42, then through the pipe 45 to the right hand end of the cylinder 40. The motive fluid in the left hand end of this cylinder may then be discharged through the pipe 44 through the valve 42 and through a discharge pipe 48.

It will now be seen that the valve 42 controls the passage of motive fluid to and from the cylinder 40 and the piston in this cylinder operates the valve 34 to control the passage of motive fluid to and from the cylinder 24. The valve 42 is therefore in the nature of a pilot valve or auxiliary valve for controlling the main valve 34. It is this valve 34 which controls the motive fluid that produces the movement of the frame and racks.

Figure 8:
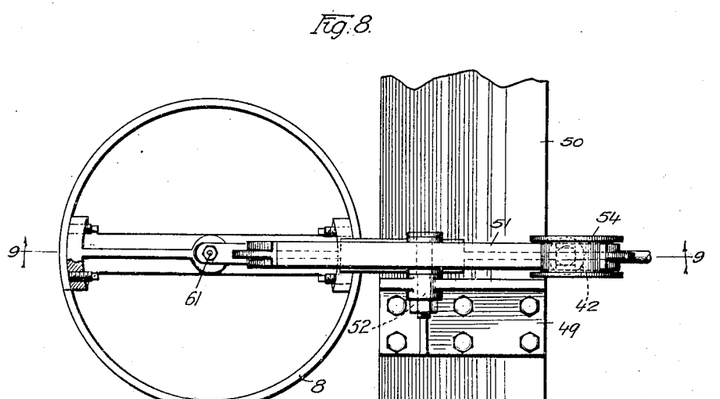
Fig. 8 is a top plan of a portion of the valve mechanism which controls the supply of motive fluid to the turning mechanism shown in Fig. 6.
Figures 9, 10, 11, 12:
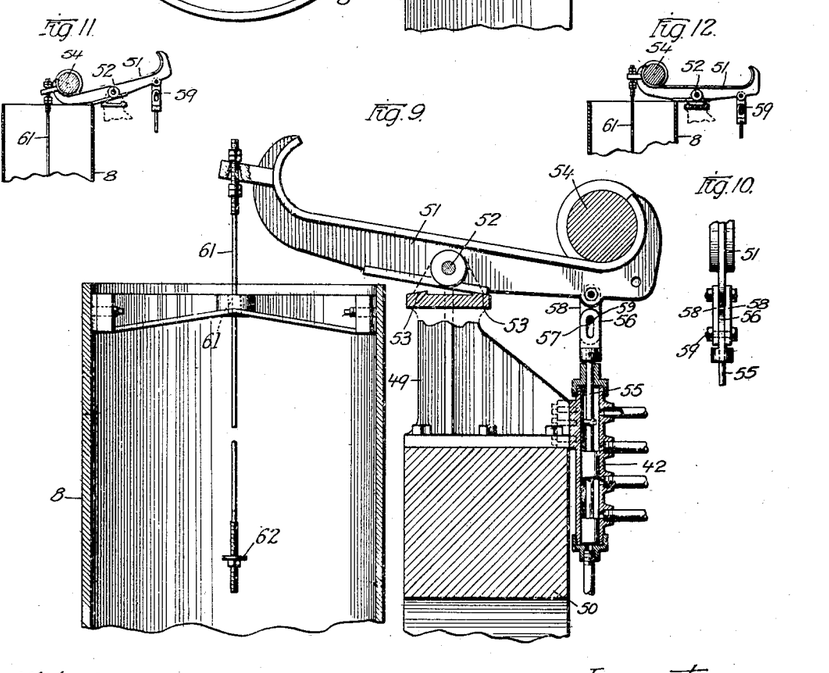
Fig. 9 is a vertical section on line 9—9 of Fig. 8.
Fig. 10 is a side elevation illustrating a detail of Fig. 9.
Figs. 11 and 12 show different positions of the mechanism illustrated in Figs. 8 and 9.

The valve 42 and the mechanism for operating the same are shown in detail in Figs. 8 and 9 and will now be described more in detail.

A bracket 49 is mounted upon a suitable support 50 so that it will be located at a point closely adjacent to the upper end of the plunger 8 when the latter is in its raised position as shown in Fig. 3. A rocker 51 is pivoted to this bracket at 52. This rocker is permitted a limited tilting movement in either direction from its horizontal position, the movement in either direction being limited by a stop 53. The rocker 51 has mounted thereon a flanged roller 54. When the rocker 51 is tilted in either direction slightly beyond its horizontal position, the roller 51 will move to the lower end of the rocker, thereby producing a quick and sudden movement of the rocker. When the plunger 8 is raised and immediately before the plunger reaches the limit of its upward movement the upper edge of the plunger strikes the bottom of the rocker 51. The parts will then be in the position diagrammatically illustrated in Fig. 11. Continued upward movement of the plunger 8 will then move the rocker 51 to its horizontal position shown in Fig. 11, but as soon as the horizontal position is passed the roller 54 starts to roll from the left hand end of the rocker 51 to the right hand end and this produces a quick movement of the rocker 51 to the position shown in Fig. 9. This movement of the rocker 51 serves to impart a quick movement to the valve 42 as follows:—The stem 55 of the valve 42 has a flat extremity 56 provided with a slot 57. A pair of links 58 (see Figs. 9 and 10) are secured to the rocker 51 and carry a cross pin 59 which operates in the slot 57. The extremity 56 of the valve stem operates between the two links 58. This structure constitutes a lost motion connection between the rocker 51 and the valve stem 55. The valve 42 will therefore remain stationary while the rocker 51 is moving from the position shown in Fig. 11 to the horizontal position shown in Fig. 12. When the rocker reaches its horizontal position shown in Fig. 12, the lost motion is taken up because the pin 59 is at the upper end of the slot 57. Therefore, when the roller 54 rolls over to the right end of the rocker the valve 42 will be moved downwardly with a quick action.

When the plunger 8 is lowered the rocker 51 is returned to its initial position. This is accomplished by securing a rod 60 to the left end of the rocker 51. This rod passes through an opening 61 in the upper end of the plunger 8. The lower end of the rod 60 is provided with an adjustable shoulder 62, which is adapted to be engaged by the upper end of the plunger 8 when the plunger approaches its lowermost position. When the plunger 8 first engages the shoulder 62 the rocker 51 will be moved first to its horizontal position, but during this movement of the rocker the valve 42 will not move because the pin 59 will merely move to the upper end of the slot 57. However, the further slight downward movement of the plunger 8 will tilt the rocker 51 slightly beyond this horizontal position and then the roller 54 will roll over to the left end of the rocker thereby causing a quick movement of the rocker to its initial position shown in Fig. 11. The valve 42 will be actuated during this final quick movement of the rocker because the pin 59 will then be in engagement with the upper end of the slot 57.

It will now be seen that as the plunger 8 approaches the limit of its upward movement the rocker 51 is actuated to move the valve 42 to such a position that it will cause the auxiliary piston 41 to shift the valve 34 to the full line position shown in Fig. 13. By the time the plunger 8 reaches its raised position in which one of the notches of the ratchet wheel 12 is in engagement with the pin 22 the piston 27 will start making its operative stroke to impart rotative movement to the racks. When the plunger 8 is lowered and as it approaches the limit of its downward movement the rocker 51 is actuated to return the valve 42 to its initial position in which motive fluid is admitted to the cylinder 40 in such a way as to cause the piston 41 to move the valve 34 to its dotted line position. The piston 27 will then be operated to return it to its initial position. This will return the arm 23 and its pin 22 to their initial position in readiness for the pin 22 to engage in another notch when the ratchet wheel 12 is again raised.

It will be noted that on the operative stroke of the piston 27 it is operating against a considerable load as it must turn the entire frame, the racks and all of the hides supported thereby, but when the piston 27 is making its return stroke it is operating against no load. Means is therefore provided for causing the piston 27 to move slowly when it is making its operative stroke and to return quickly when it is making its return stroke. The mechanism for producing this result may comprise a casing 63 containing an orifice plate having a small orifice which will restrict the flow of the motive fluid through the casing 63. A check valve 64 is located in a pipe 65 which is by-passed around the casing 63. The check valve 64 closes when the fluid tends to pass through the pipe 65 toward the cylinder 24, but opens when it passes through the pipe 65 from the cylinder 24. Therefore, when the motive fluid is supplied through pipe 37 to the cylinder 24 the check valve 64 will close and the fluid is made to flow through the small orifice in the casing 63. This causes the piston 27 to move slowly in making its operative stroke. However, when the piston 27 makes its return stroke the fluid discharged from the right hand end of the cylinder 24 does not have to pass through the small orifice in the casing 63 because it may pass through the pipe 65 and through the check valve 64. The supply of fluid through the pipe 38 is not throttled and therefore the return stroke of the piston 27 will be made quickly.

The operation of the entire machine briefly repeated is as follows:—It will be assumed that all of the racks have been loaded with hides and that the racks are in their lowermost position. The hides supported by five of the racks will then be dipping in the solutions in the five vats. The rack adjacent to the last vat 5 (Fig. 2) may be unloaded while the rack adjacent to the first rack 1 may be loaded. These two operations may take place at the same time, whereas, if there were only one extra rack it would first have to be loaded and then unloaded, and this would require twice as much time. When the hides have remained in the vats for the proper period and when the two racks in the open space 6 have been unloaded and loaded, the main valve 19 is operated by moving the hand lever 20, and the plunger 8 is then raised. This simultaneously lifts all of the racks until the hides are out of the vats. When the plunger reaches its raised position the fluid operated mechanism, described above, is automatically set in operation to rotate the plunger and the racks one-seventh of a revolution. When the racks come to rest the hand lever 20 of the main valve is actuated so that motive fluid will be discharged from the main cylinder thereby permitting the plunger 8 to descend. As the plunger 8 descends the hides will be dipped into the vats, but as the racks have progressed each set of the hides will be dipped in the solution contained in the next succeeding vat. When the plunger 8 reaches or approaches its lowermost position the fluid operated mechanism described above returns the arm 23 to its initial position. On this downward movement of the plunger 8 the rack which was loaded just prior to the upward movement of the plunger now descends into the first vat and the rack which was unloaded just prior to the upward movement of the plunger 8 is now in position to be loaded, while the rack which was in the last vat when the plunger was raised is now lowered into the open space 6 in readiness to be unloaded.

The machine has a very large capacity as it is capable of dipping a large number of hides at one time. Notwithstanding this fact it may be readily and easily operated as the operation of a single lever controls the entire apparatus. As the racks are moved in a continuous path they may be permanently carried by the machine thus eliminating the prior necessity of transferring loose racks. Practically no time is lost because at each dipping operation one of the racks is being loaded and another unloaded and then the unloaded rack moves to an immediately adjacent position where it is again loaded.

Although the machine has been described as a hide treating machine it is obvious that a machine constructed in accordance with the invention may be used for various other purposes.

What I claim is:

1. The combination of a series of circularly arranged vats, a vertically movable frame having means for supporting above each vat articles to be dipped therein, means to raise and lower said frame, actuating mechanism for rotating the frame, and control means for the actuator automatically operated by the frame.

2. The combination of a plurality of circularly arranged vats, a vertically movable frame having means for supporting above each vat articles to be dipped therein, means to reciprocate the frame vertically, and actuating means for rotating the frame, and control mechanism therefor actuated by the frame whereby rotative movement is automatically imparted to the frame when in a raised position.

3. The combination of a plurality of circularly arranged receptacles, a vertically movable frame having means for supporting above each receptacle articles to be dipped therein, means to reciprocate the frame vertically, actuating means for imparting a rotative movement to the frame, control means for the actuating means whereby the actuating means is automatically set in operation when the frame reaches its raised position, and means whereby the actuating means is restored to normal position when the frame is lowered.

4. The combination of a plurality of circularly arranged vats, a vertically movable support for holding an article to be dipped in the vats, means to raise and lower the support, and means automatically acting when the support reaches its raised position to impart rotative movement to the support, said means including an actuating mechanism, control means therefor actuated when the support reaches its raised position, so that the rotative movement is given in timed relation to the vertical movement.

5. The combination of a vertically movable frame having a circularly arranged series of racks, an arcuate series of vats in which articles supported by the racks may be dipped, there being an open space between two of the vats whereby at least one of the racks may be loaded and unloaded, means to raise and lower the frame, an actuating mechanism for imparting rotary movement to the frame, means for automatically establishing a driving connection between the frame and the actuating mechanism when in a raised position, and control means for the actuating mechanism automatically actuated by movement of the frame to the raised position.

6. The combination of a vertically movable hydraulic plunger, a circular series of article-carrying racks supported thereby, a circular series of vats in which the articles may be dipped when the plunger is lowered, actuating means for rotating the racks, means for automatically establishing a driving relation between the actuating means and the racks, control means for the said actuating means automatically actuated when the rack is moved to raised position.

7. The combination of a fluid actuated plunger adapted to move in a vertical direction, a circular series of racks supported by said plunger, a circular series of vats in which articles carried by said racks may be dipped when said plunger is lowered, fluid operated means for imparting rotative movement to said plunger when it is in its raised position, and means for causing said last named means to operate when said plunger reaches its raised position.

8. The combination of a plurality of circularly arranged vats, a vertically movable support for holding an article to be dipped in said vats, means to raise and lower said support, and means for automatically imparting rotative movement to said support when the article is raised above the vats, said means including an actuating means mounted independent of the frame and normally out of driving engagement therewith, and control means for the actuating means automatically controlled by movement of the support to a raised position.

9. The combination of a circularly arranged series of vats, a vertically movable frame for holding an article to be dipped in said vats, oscillating means normally disconnected from said frame but adapted to be operatively connected therewith when said frame is in its raised position, and means automatically set in operation when said frame reaches its raised position for oscillating said means and thereby imparting rotative movement to said frame.

10. The combination of a circularly arranged series of vats, a vertically movable frame adapted to hold an article to be dipped in said vats, means to raise and lower said frame, fluid operated means for imparting rotative movement to said frame, valve mechanism controlling said fluid operating means, and means whereby said valve mechanism is actuated when said frame approaches its raised position to admit motive fluid to said fluid operated means.

11. The combination of a circularly arranged series of vats, a vertically movable frame adapted to hold articles to be dipped in said vats, means to raise and lower said frame, and means to impart rotative movement to said frame when it is in its raised position, said means comprising fluid operated means having operative connection with said frame when the latter is in its raised position and valve mechanism controlled by the movement of said frame, said valve mechanism being automatically actuated to admit motive fluid to said fluid operated means when said frame approaches its raised position and being automatically operated to discharge the motive fluid from said fluid operating means when said frame is lowered.

12. The combination with a vertically reciprocating frame, of means to impart rotative movement to the frame when it is in its raised position, said means comprising an oscillatory member adapted to have operative connection with the frame when the latter is in its raised position, and means to move said member in one direction when it has operative connection with the frame to thereby impart rotative movement to the frame, said means being adapted to move said member back to its normal position when the frame is lowered and said operative connection is broken.

13. A machine of the kind described comprising a vertically movable frame, means to raise and lower the frame, a movable member having operative connection with the frame only when the latter is in its raised position, and means to move said member when the frame is in its raised position to thereby impart rotative movement to the frame, said means being adapted to return the member to its normal position when the frame is lowered.

14. A dipping machine comprising a circularly arranged series of vats, a vertically movable frame adapted to support articles to be dipped in said vats, means to raise and lower said frame, and means for imparting rotative movement to said frame, said means comprising a member having operative connection with said frame only when the latter is in its raised position, and means for actuating said member to rotate said frame when said member and frame are operatively connected, said member being returned to its normal position when said frame is lowered and said operative connection is broken.

15. The combination of a circularly arranged series of vats, a frame having means for supporting articles to be dipped in said vats, hydraulic means for raising and lowering said frame and fluid operated means for imparting rotative movement to said frame, said means including a valve controlled mechanism automatically actuated by the frame.

16. The combination of a circularly arranged series of vats, a vertically movable frame having means for holding articles to be dipped in said vats, hydraulic means for raising and lowering said frame, and fluid operated means including an actuating means and controlling valve therefor automatically controlled so that when said frame reaches its raised position said actuating means will impart rotative movement to said frame.

17. The combination with a circularly arranged series of vats, a vertically movable frame having means for supporting articles to be dipped in said vats, means for raising and lowering said frame, fluid operated means comprising a member having operative engagement with said frame only when the latter is in its raised position, means whereby said member is actuated by said fluid operated means when said frame reaches its raised position, and means whereby said member is returned to its normal position when said frame is lowered.

18. The combination of a plurality of vats, a vertically movable frame for supporting an article to be dipped in said vats successively, means to raise and lower said frame and means adapted to automatically act upon said frame after it has reached its raised position to impart rotative movement thereto, said means including an actuating means, and control means therefor actuated through movement of the frame.

19. The combination of a plurality of vats, a vertically movable frame for supporting an article to be dipped in said vats successively, means to raise and lower the frame, and fluid operated means for imparting rotative movement to the frame when the frame is in its raised position, said fluid operated means including a fluid actuated mechanism adapted to be connected with the frame when in a raised position, and a controller therefor actuated automatically when the frame reaches a raised position.

20. The combination of a plurality of vats, a vertically movable frame for supporting an article to be dipped in said vats successively, hydraulic means to raise and lower said frame and fluid operated means adapted to automatically act upon said frame when it is in its raised position to impart rotative movement to said frame, said fluid operated means including a fluid actuated mechanism and a controller therefor.

21. A dipping apparatus having a vat, a support, means for raising and lowering said support to dip the articles carried thereby in said vat, and actuating means for moving said support to or from a position above said vat, control mechanism therefor automatically moved by the support when raised, whereby the actuating means operates in timed relation with respect to the other means.

22. A dipping apparatus having a vat, a support, means for raising and lowering said support to dip articles carried thereby in said vat, and means controlled by said first named means for moving said support to or from a position above said vat.

23. A dipping apparatus having a vat, a support, manually controlled means for raising and lowering the support to dip articles carried thereby in the vat, and means controlled by the first named means to move the support to or from a position above the vat, said last named means including an actuating mechanism adapted to impart rotative movement to the support, and control means therefor automatically actuated.

24. The combination of a plurality of vats, a plurality of supports, means for raising and lowering the supports simultaneously to immerse the articles carried thereby in certain of the vats, and means for simultaneously moving the several supports each from above one vat to a position above another vat, one of the means being designed to operate in timed relation with respect to the other means.

25. The combination of a plurality of vats, a plurality of supports, means for raising and lowering the supports simultaneously to dip the articles carried thereby in certain of the vats, and means controlled by the first named means for simultaneously moving the several supports each from above one vat to a position above another vat.

26. The combination of a series of circularly arranged vats, a frame provided with means for supporting articles placed thereon, means for raising and lowering said frame to dip said articles in one or more of said vats, and means for rotating said frame to transfer said articles from above one vat to above another vat, one of said means being designed to operate in timed relation with respect to said other means.

27. The combination of a series of circularly arranged vats, a frame provided with means for supporting articles placed thereon, means for raising and lowering said frame to dip said articles in one or more of said vats, and means controlled by said first named means for rotating said frame to transfer said articles from above one vat to above another vat.

28. The combination of a plurality of vats, a support, means for raising and lowering the support to dip articles carried thereby in one of the vats, and means for moving the support from a position above one vat to a position above another vat, the last named means being operatively connected to the support when the support reaches a predetermined height.

29. The combination of a series of circularly arranged vats, a frame provided with means for supporting articles placed thereon, means for raising and lowering said frame to dip said articles in one or more of said vats, and means for rotating said frame to transfer said articles from above one vat to above another vat, said last named means being operatively connected to said frame when said support reaches a predetermined height.

30. The combination of a plurality of vats, a support, manually controlled means for raising and lowering said support, and means controlled by said first named means for horizontally moving said support.

In witness whereof, I have hereunto subscribed my name.

CHARLES P. BOSSERT.